United States Patent [19]

Nagaoka et al.

[11] Patent Number: 5,128,529
[45] Date of Patent: Jul. 7, 1992

[54] AUTOFOCUSING DEVICE WITH IMPROVED DISTANCE FOCUSING ACCURACY

[75] Inventors: Shinji Nagaoka; Koji Sato; Michio Kawai, all of Yotsukaido, Japan

[73] Assignee: Seikosha Co., Ltd., Japan

[21] Appl. No.: 458,765

[22] Filed: Dec. 29, 1989

[30] Foreign Application Priority Data

Dec. 29, 1988 [JP] Japan .................. 63-169429[U]

[51] Int. Cl.$^5$ ............................ G01J 1/20; G03B 3/00
[52] U.S. Cl. ................................ 250/201.6; 354/403
[58] Field of Search .................. 250/201.6, 201.4; 354/403; 356/1

[56] References Cited

U.S. PATENT DOCUMENTS

| | | | |
|---|---|---|---|
| 4,257,705 | 3/1981 | Hosoe et al. | 250/201.6 |
| 4,522,492 | 6/1985 | Masunaga | 250/201.6 |
| 4,601,574 | 7/1986 | Yamane et al. | 250/201.6 |
| 4,621,292 | 11/1986 | Hirao et al. | 354/403 |
| 4,673,274 | 6/1987 | Nagaoka et al. | 354/403 |
| 4,692,012 | 9/1987 | Tano et al. | 354/403 |
| 4,693,597 | 9/1987 | Shiomi et al. | 354/403 |
| 4,720,723 | 1/1988 | Harunari et al. | 354/403 |
| 4,758,082 | 7/1988 | Kozuki et al. | 354/403 |
| 4,773,751 | 9/1988 | Matsuda et al. | 354/403 |
| 4,796,044 | 1/1989 | Amanuma et al. | 354/403 |

FOREIGN PATENT DOCUMENTS 0140532 10/1979 Japan .................. 250/201.4

Primary Examiner—David C. Nelms
Assistant Examiner—Michael Messinger
Attorney, Agent, or Firm—Bruce L. Adams; Van C. Wilks

[57] ABSTRACT

An auto-focusing device includes a light emitting element for emitting an optical beam to be projected upon an object, an image position detecting element for receiving the optical beam reflected from the object for outputting an image position signal, and range computing circuitry for receiving the image position signal and computing therefrom the range to the object and outputting a corresponding range signal. First and second level deciding circuits decide whether or not the computed data based on the image position signal is at a level validating the computation of the range signal. The level deciding circuits output a remotest or nearer-than-remotest signal dependent upon the computed image position signal if the computed data from the image position signal is not validated. A lens position setting device sets a lens position from either the range signal, the remotest signal or the nearer-than-remotest signal in accordance with the decisions of the first and second level deciding circuits.

5 Claims, 3 Drawing Sheets

AUTOFOCUSING DEVICE WITH IMPROVED DISTANCE FOCUSING ACCURACY

BACKGROUND OF THE INVENTION

1. Field of the Invention

The present invention relates to an auto-focusing device and, more particularly, to an auto-focusing device having a light emitting element for emitting an optical beam to be projected upon an object.

2. Description of the Prior Art

There have been attempts to provide an auto-focusing device using an optical beam. For example, a method by which an optical beam is projected upon an object and the reflected beam is detected by an image position detecting element for outputting image position signals, is disclosed in Japanese Patent Laid-Open No. 61-221717 entitled "Auto-Focusing Device for Cameras". The image position detecting element is a semiconductor element called a "PSD" (Position Sensitive Device). In this image position detecting element, first and second junctions are formed at the righthand and lefthand sides facing the object to generate image position signals (in photocurrent). These image position signals are dependent upon how much of the optical signal reflected from the object is incident upon the light receiving face of the image position detecting element. The image position signals are amplified, detected and integrated and are output to an image position signal processor for outputting a range of data (in voltage). A range computing circuit computes a range signal for determining the lens position from the range of data.

In general, one method of deciding whether or not a valid range signal can be generated requires first establishing a limit level. Then, the first and second computed values are evaluated to determine whether the range signal is within the established limit. A second method of deciding whether or not a valid range signal can be generated requires estimating the range from the absolute value of the level (or intensity) of an incident optical signal. Then the first and second computed values are evaluated to determine whether the range signal is within the estimated range.

In either method, it is decided according to the S/N ratio of the incident beam and the threshold level whether or not the range signal is valid. If it is judged that the computed range signal is not valid, the object is assumed to be at the remotest position.

To improve the reliability of the range signal, the threshold level of the acceptable S/N ratio is set at a particular value. However, this creates a problem in positioning the lens for maximum focusing accuracy when the object is at a distance. With the threshold level set to improve the reliability of the range signal, the S/N ratio detected from distant objects near the range of the remotest position is such that focusing accuracy is deteriorated.

SUMMARY OF THE INVENTION

The present invention has been conceived to solve the difficulties thus far specified. An object of the present invention is to provide a focusing device which improves the focusing accuracy of auto focusing devices in a range when the object is distant. The present invention evaluates the level of arithmetic data generated from image position signals by means of first and second level deciding and if it is determined that the object is distant, determines the appropriate lens position dependent on remotest range signal or a near-remotest range signal. The choice of the remotest or near-remotest range signal is determined by judgment of the intensity of the reference beam reflected by the object. If it is determined that the object is not distant, i.e., within a distance where the device can validly calculate the range, lens position is dependent on a calculate range signal based on the reference beam reflected by the object.

According to the present invention, there is provided an auto-focusing device which includes a light emitting element for emitting an optical beam to be projected upon an object; an image position detecting element which detects of the optical beam reflected from the object for outputting image position signals; and a range computing means for receiving the image position signals to produce computed data and a range signal. The inventive device also includes a first level deciding means for deciding whether or not the computed data computed from said image position signals is at a valid level for positioning the lens in accordance with calculation of the computed data. If the computed data is not valid, a second deciding means decides whether a remotest signal or a nearer-than-remotest signal should be sent to position the lens. If the lens is positioned according to a valid level of computed data, positioning is dependent on a calculation based on the detected reflection. If it is decided that calculation is not efficient, the lens is positioned either at a remotest position or a near-remotest position depending on a judgment of the reflection level.

BRIEF DESCRIPTION OF THE DRAWINGS

Other objects, features and advantages of the present invention will become apparent from the following description taken with reference to the accompanying drawings, in which.

DESCRIPTION OF THE PREFERRED EMBODIMENT

Figure 1:
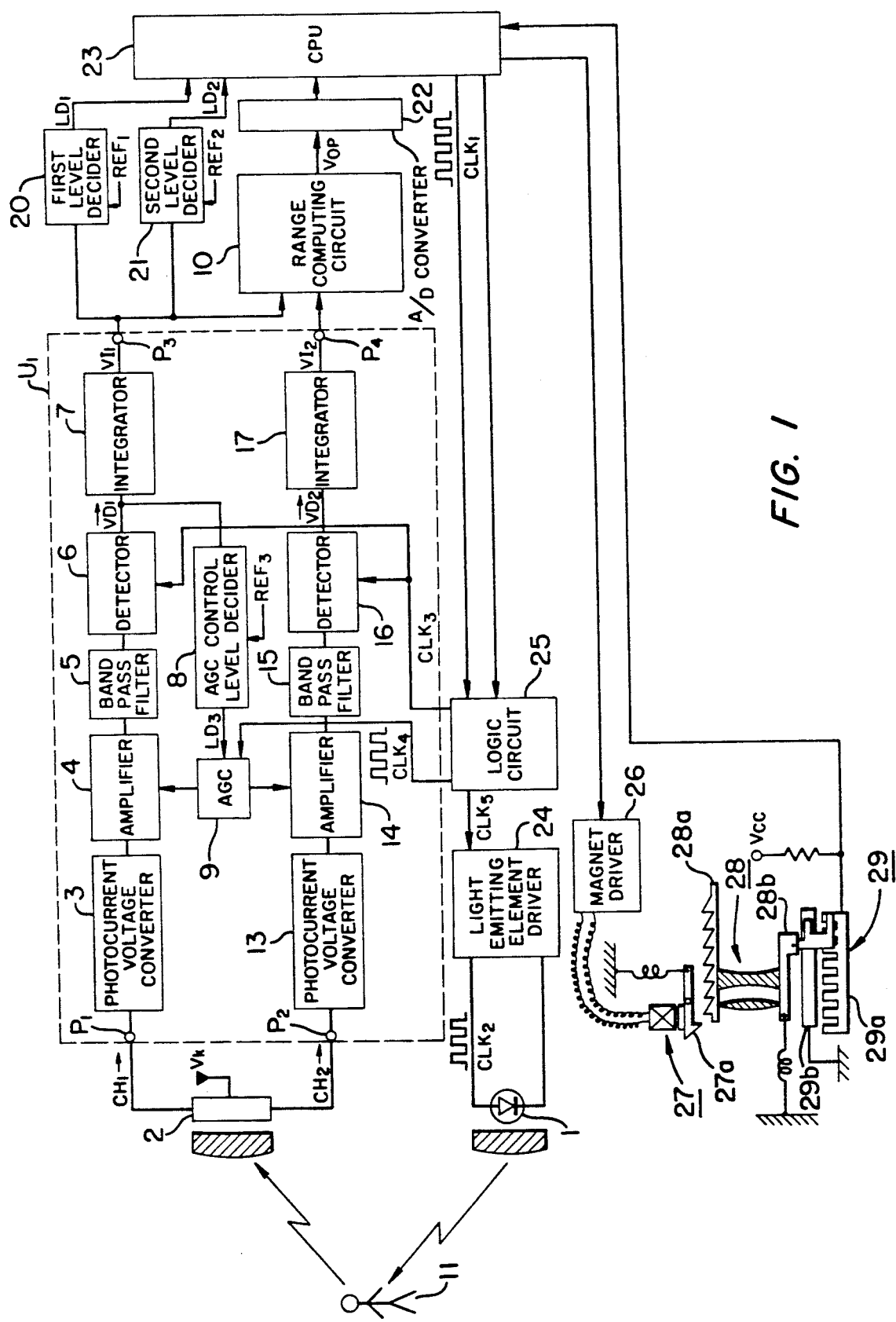
FIG. 1 is a block diagram showing one embodiment of the auto-focusing device according to the present invention.

One preferred embodiment of the auto-focusing device of the present invention will be described in detail with reference to FIG. 1.

The auto-focusing device is constructed of a light emitting element or means 1, an image position detecting element or means (PSD) 2, a photocurrent processor $U_1$, first and second level deciders 20 and 21, and a range computing circuit 10.

The light emitting element 1 emits an optical beam in response to the clock pulse $CLK_2$ of a light emitting element or means driver 24 to project it upon an object 11. Here, the pulse $CLK_2$ is inputted as a clock pulse $CLK_5$ in phase from a logic circuit 25 to the light emitting element driver 24.

The image position detecting element 2 has first and second junctions and is inversely biased with a voltage $V_K$ to generate first and second image position signals (which will be called first and second photocurrents) from the optical signal reflected from the object 11. The first photocurrent is the shorter range side, and the second photocurrent is the longer range side.

The photocurrent processor $U_1$ amplifies, detects and integrates first and second photocurrents $CH_1$ and $CH_2$ inputted from its terminals $P_1$ and $P_2$, to output them as first and second computed data $VI_1$ and $VI_2$ (in voltage) from its terminals $P_3$ and $P_4$.

The photocurrent processor $U_1$ is composed of first and second photocurrent-voltage converters 3 and 13, amplifiers 4 and 14, band-pass filters 5 and 15, detectors 6 and 16, and integrators 7 and 17.

The first and second photocurrents $CH_1$ and $CH_2$ outputted from the first and second junctions of the image position detecting element 2 are inputted through the terminals $P_1$ and $P_2$ to the first and second photocurrent-voltage converters 3 and 13. These first and second photocurrent-voltage converters 3 and 13 convert the first and second photocurrents inputted to voltages, which are sent out through the amplifiers 4 and 14 and the band-pass filters 5 and 15 to the detectors 6 and 16.

Here, the band-pass filters 5 and 15 are filters for passing only the optical beams modulated by the clock pulse $CLK_2$. Moreover, the detectors 6 and 16 receive a sampling pulse $CLK_3$, which is in phase with the clock pulse $CLK_2$ to be sent from the light emitting element driver 24 to the light emitting element 1 by dividing a clock pulse $CLK_1$ from a CPU 23 at the logic circuit 25. Detectors 6 and 16 and detect the amplified first and second photocurrents $CH_1$ and $CH_2$ and output first and second detected signals $VD_1$ and $VD_2$.

These first and second detected signals $VD_1$ and $VD_2$ are smoothed by the integrators 7 and 17 to generate first and second computed data $VI_1$ and $VI_2$, which are outputted from the terminals $P_3$ and $P_4$. An AGC loop is composed of an AGC 9, the amplifier 4, the band-pass filter 5, the detector 6, and an AGC control level decider 8. The AGC 9 operates to hold the gains of the amplifiers 4 and 14 when it receives a decision signal $LD_3$ which is outputted when the level of the first detection signal $VD_1$ exceeds a reference level $RRF_3$ of the level decider 8. The gains of the amplifiers 4 and 14 are switched in response to a clock pulse $CLK_4$ outputted from the logic circuit 25.

The range computing circuit 10 has a computing function to divide the difference between the first computed data $VI_1$ and $VI_2$ inputted from the terminals $P_3$ and $P_4$ of the image position signal processor $U_1$ by the summation of the same, and digitizes and sends a computed range signal $V_{OP}$ (in voltage) through an A/D converter 22 to the CPU 23.

The first and second level deciders 20 and 21 send out reference levels $REF_1$ and $REF_2$ to the CPU 23. The reference levels $REF_1$ and $REF_2$ and another reference level $REF_3$ are kept in the relation of $REF_3 > REF_1 > REF_2$.

Figure 2:
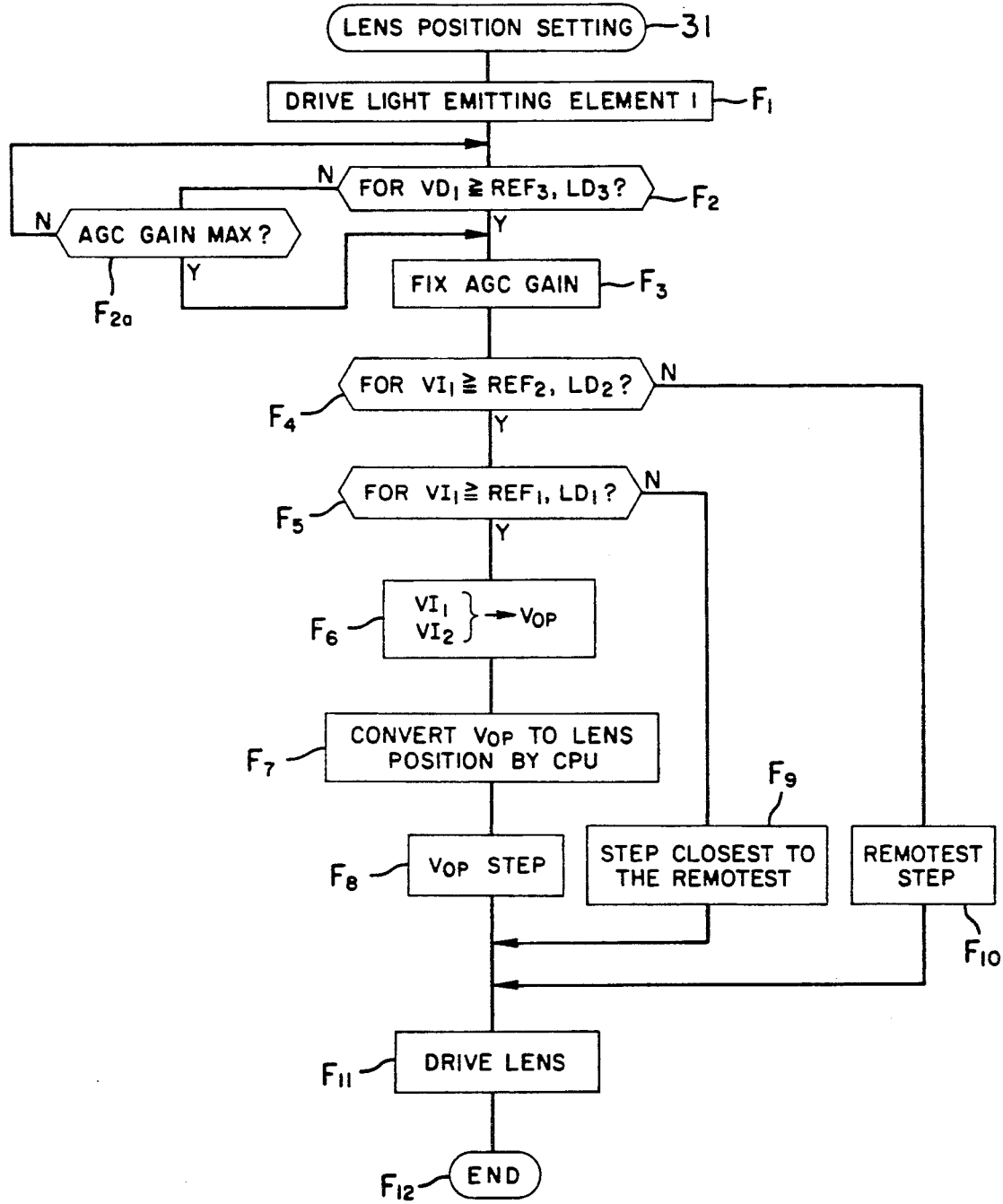
FIG. 2 is a flow chart showing a lens position setting program.

In accordance with a lens position setting program 31, as shown in FIG. 2, the light emitting element 1 is driven at Box $F_1$ by the light emitting element driver 24. At judgment Box $F_2$, the gains of the amplifiers 4 and 14 are increased until the level of the first detection signal $VD_1$ reaches the reference level $REF_3$, so that the presence of the decision signal $LD_3$ is decided under the condition in which the first detection signal $VD_1$ takes the reference level $REF_3$. Here, if the gain of the AGC is not the maximum, the judgment is continued at Box $F_{2a}$ until the maximum is reached. Then, the routine flows to Box $F_3$. When the decision signal $LD_3$ is outputted, the gain of the AGC 9 is held at a constant level at the Box $F_3$. At decision Box $F_4$, it is decided whether or not the decision signal $LD_2$ is present when the computed data $VI_1$ and the reference level $REF_2$ take the relation of $VI_1 \geq REF_2$. If NO, i.e., in the absence of the decision $LD_2$, the lens position is set at the remotest step at Box $F_{10}$.

If the condition of $VI_1 \geq REF_1$ is satisfied, the presence of the decision signal $LD_1$ is decided at Box $F_5$. In the absence of the decision signal $LD_1$, the lens position is set at the step closest to the remotest step at Box $F_9$. In the presence of the decision signal $LD_1$, the range signal $V_{OP}$ is valid. At Box $F_6$, therefore, the difference and summation of the first and second computed data $VI_1$ and $VI_2$ are computed so that the range signal $V_{OP}$ may be generated by dividing the difference by the summation.

At Box $F_7$, the range signal $V_{OP}$ is compared with the data stored in the CPU 23 to determine the lens position step. Since this computed step is accepted as being correct in the routine, the step based upon the range signal $V_{OP}$ is set at Box $F_s$. At Box $F_{11}$, the lens is driven on the basis of any of the computation $F_s$ by the range signal, the Box $F_9$ closes to the remotest and the remotest Box $F_{10}$.

The lens driving mechanism is composed of a lens mount 28, a magnet 27 and an encoder 29.

The lens mount 28 is equipped with a ratchet 28a and a brush 28b and is moved either leftward by means of a spring or rightward and leftward by means of a motor. The movement of this lens mount 28 is detected by the lead 29b and marker 29a of the encoder 29 and in terms of the position of the brush 28b so that a signal for stopping the lens mount 28 is sent out to the CPU 23 in the position which is identical to a focal signal measured in advance. If a magnet driver 26 is operated by the control of the CPU 23, the lens mount 28 is stopped at its ratchet 28a by a pawl 27a of the magnet 27.

Figure 3:
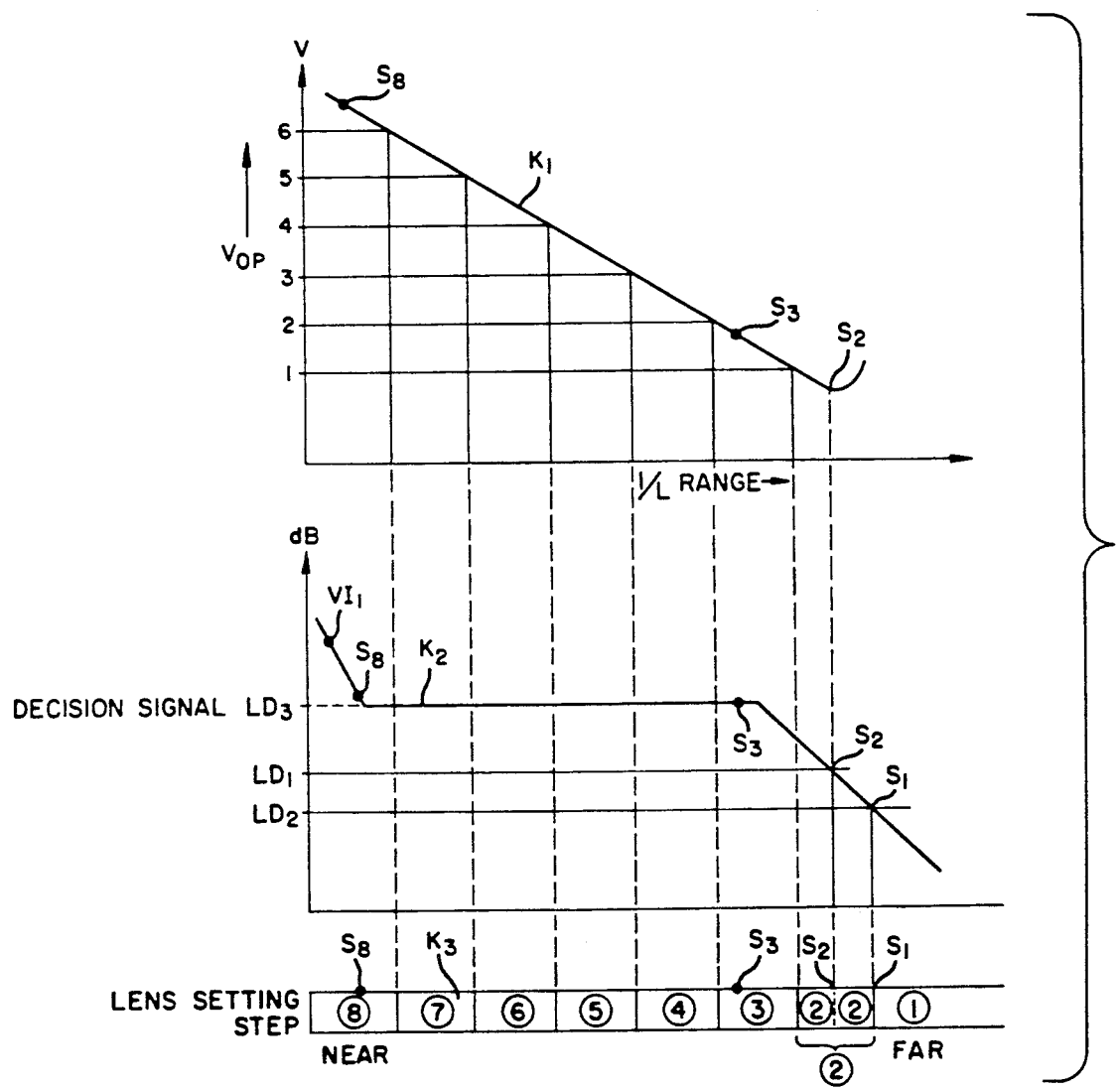
FIG. 3 is a diagram showing the characteristics of FIGS. 1 and 2.

In the auto-focusing device thus constructed, if the not-shown shutter button is depressed, the light emitting element 1 is driven by its driver 24 so that the modulated optical beam (or signal) by the clock pulse $CLK_2$ is projected upon the object 11. The modulated beam reflected from the object 11 goes into the image position detecting element (PSD) 2. This image position detecting element 2 sends out its first and second photocurrents $CH_1$ and $CH_2$ to the terminals $P_1$ and $P_2$ of the photocurrent processor $U_1$. This photocurrent processor $U_1$ executes the lens position setting program 31 to judge the presences of the decision signals $LD_3$, $LD_1$ and $LD_2$ so that it holds the gain of the AGC at a constant level at the instant when the decision signal $LD_3$ is outputted. Then, the first computed data $VI_1$ (in voltage) is generated, as indicated by a curve $K_2$, shown in FIG. 3 and the lens setting step ⑧ of a curve $K_3$ corresponding to the range signal $V_{OP}$ is set at the shortest point $S_s$. At a point $S_3$ of a curve $K_1$, the step ③ of the point $S_3$ of the curve $K_3$ is set.

If the range signal $V_{OP}$ becomes so unstable that the decision signal $LD_2$ is not outputted, it is estimated that the object 11 is located at a position farther than the point $S_1$ of the curve $K_2$. Thus, the lens is set at the remotest position ①, as indicated on the curve $K_3$. If the decision signal $LD_1$ is outputted, the lens position is set at ②. Even in case the decision signal $LD_1$ is not outputted, the lens position is set at the step ② closest to the step ① if the decision signal $LD_2$ is outputted.

According to the present invention, the erroneous measurements in the vicinity of the remotest step can be prevented even if the threshold level is set at the safety side while considering the S/N ratio between the reflected beam coming from the object and the noises.

What is claimed is:

1. An auto-focusing device, comprising: light emitting means for emitting an optical beam to be projected upon and reflected by an object; image position detecting means for detecting the optical beam reflected by the object and outputting in response thereto an image position signal representative of the object distance and the intensity of the reflected optical beam; computing means responsive to the image position signal for computing computed data indicative of the object distance; means for determining whether the computed data is valid based on comparison of the intensity of the reflected optical beam with a predetermined value; and processing means operative when the computed data is determined to be valid for producing a lens position signal based on the computed data and operative when the computed data is determined to be invalid for producing a lens position signal based on the intensity of the reflected optical beam.

2. An auto-focusing device, comprising: light emitting means for emitting an optical beam to be projected upon an object; detecting means for detecting the optical beam reflected from the object and outputting a distance signal representative of the object distance and the intensity of the reflected optical beam; first evaluating means receptive of the distance signal for deciding whether a first decision signal should be output by comparing the intensity of the reflected optical beam to a predetermined first value; second evaluating means receptive of the distance signal for deciding whether a second decision signal should be output by comparing the intensity of the reflected optical beam to a predetermined second value; range computing means receptive of the distance signal for computing a computed range value signal dependent on the object distance; central processing means receptive of the signals output from said first evaluating means, said second evaluating means, and said range computing means for processing the signals and outputting a remotest position signal when neither the first decision signal nor the second decision signal is received, a near-remotest position signal when the first decision signal is received and the second decision signal is not received, and a range position signal based on the computed range value signal when both the first and second decision signals are received; and lens position setting means receptive of the signal output from said central processing means for accordingly setting the position of a lens.

3. An auto-focusing device according to claim 2, wherein said central processing means includes means for generating a near-range position signal when the second decision signal is received but not the first decision signal.

4. An auto-focusing device according to claim 2, wherein said detecting means includes position sensing means for detecting the reflected optical beam and generating a pair of photocurrents in response thereto, a pair of photocurrent-voltage converters receptive of the respective photocurrents and generating voltages in response thereto, a pair of amplifiers receptive of the respective voltages and generating amplified voltages in response thereto, a pair of band-pass filters receptive of the respective amplified voltages for selecting and passing selected signals, a pair of detectors receptive of the respective selected signals and generating detection signals, a pair of integrators receptive of the respective detection signals and generating integrated signals, and automatic gain control means for controlling the outputting of said pair of amplifiers dependent on a reference level.

5. An auto-focusing device, comprising: light emitting means for emitting an optical beam to be projected upon an object; detecting means for detecting the optical beam reflected from the object and outputting a distance signal representative of the object distance and the intensity of the reflected optical beam; and data processing means receptive of the distance signal for deciding whether to output a position signal based on the intensity of the detected optical beam determined from the distance signal or based on a computed value of the object distance determined from the distance signal, and then outputting a position signal.

* * * * *